INVENTOR
ELMER A. SPERRY JR.
BY
Joseph H. Lipschutz
ATTORNEY

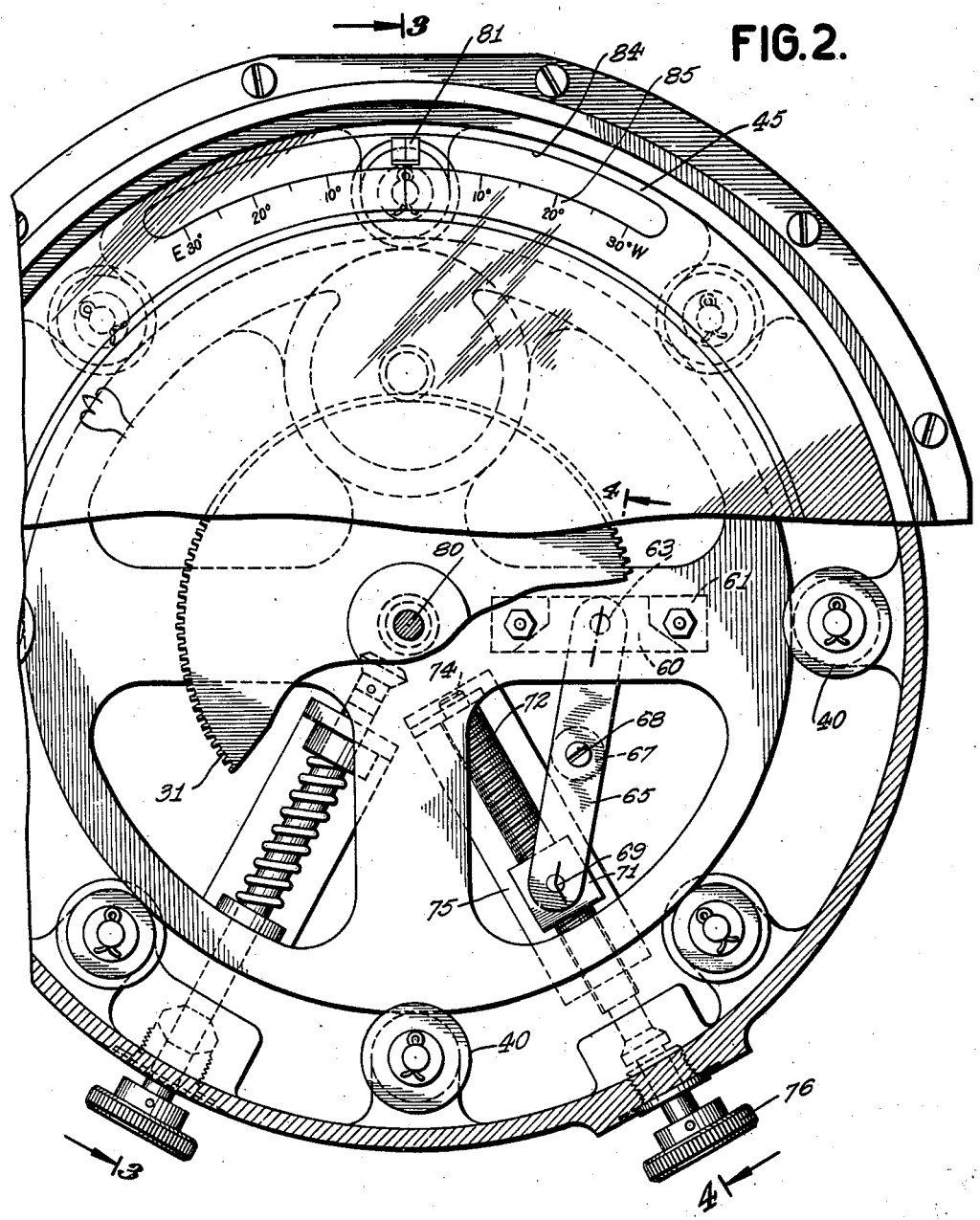

June 29, 1943.  E. A. SPERRY, JR  2,323,253
REPEATER SYSTEM FOR MAGNETIC COMPASSES
Filed June 17, 1941   3 Sheets-Sheet 3

INVENTOR
ELMER A. SPERRY JR.
BY Joseph H. Lipschutz
ATTORNEY

Patented June 29, 1943

2,323,253

UNITED STATES PATENT OFFICE 2,323,253

REPEATER SYSTEM FOR MAGNETIC COMPASSES

Elmer A. Sperry, Jr., New York, N. Y., assignor to Sperry Products, Inc., Hoboken, N. J., a corporation of New York Application June 17, 1941, Serial No. 398,388

1 Claim. (Cl. 33—222)

This invention relates to repeater systems whereby the movements of one member are transmitted to a distant member which is adapted to repeat the movements of the first member. More particularly, the invention relates to a repeater system for magnetic compasses wherein the indications of a master compass are transmitted to one or more repeater compasses located at a distance from the master compass. In such systems it is customary to employ multiplying gearing to transmit the relative movements between the compass needle and the compass bowl carried by the ship, so as to reduce the transmission error. Such transmission is effected by self-synchronous members which by reason of the multiplying gearing are adapted to rotate through a plurality of revolutions for each complete revolution of the master compass bowl with respect to the compass needle. The receiver motor operates through the same number of revolutions as the transmitter motor and therefore it is found that the receiver motor may reach a condition where it is one or more revolutions out of synchronism with the transmitter motor. Such circumstances are, for instance, where the circuit between the transmitter and receiver motors has been interrupted for some reason and the ship is turned through a substantial angle equivalent to more than one revolution of the transmitter motor, and thereafter the circuit of the transmission system is reestablished. Since the motors are self-synchronized only within the range of one revolution, the lack of synchronism between the motors of more than one revolution will not be taken care of when the circuit is reestablished. It is one of the principal objects of this invention, therefore, to provide means in such a transmission system whereby the receiver indicating element may be synchronized with the transmitter indicating element to within a range corresponding to less than one revolution of the transmitter and receiver motors and therefore to render the two systems entirely self-synchronous.

When the above system is applied to magnetic compasses it is found that the master compass transmits the relative positioning between the compass needle and the compass bowl, but this does not indicate the true geographic meridian because of the presence of magnetic variation. It is therefore another principal object of this invention to provide means whereby the repeater compass will indicate the true geographic meridian even though the master compass is displaced from the said meridian by a predetermined variation.

Further objects and advantages of this invention will become apparent in the following detailed description thereof.

In the accompanying drawings,

Fig. 2 is a front elevation of the repeater compass shown in Fig. 1, with the compass card removed.

Figure 1:
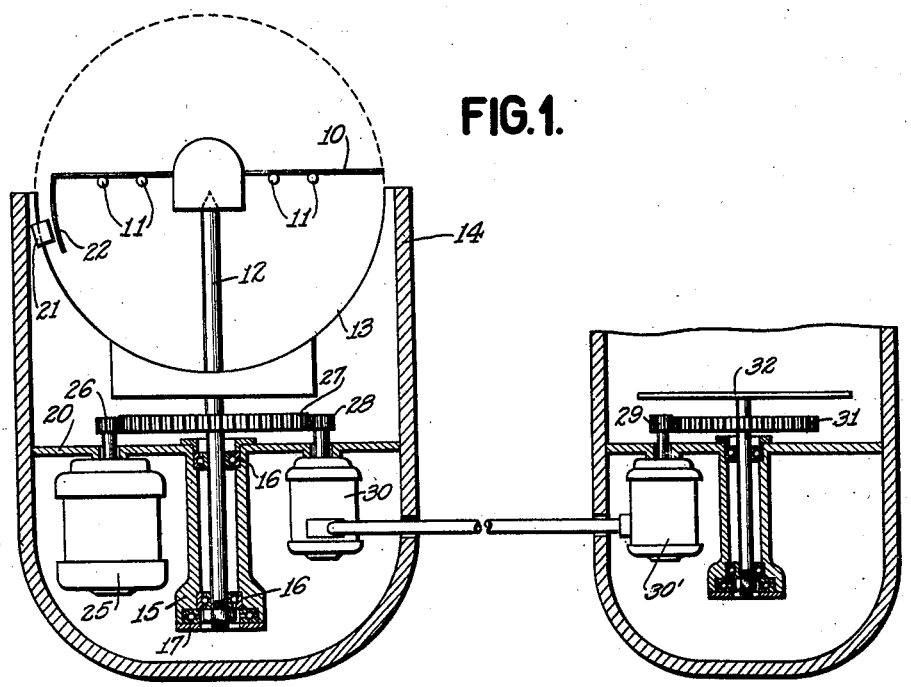
Fig. 1 is a general assembly, largely diagrammatic, showing a transmission system having the invention applied thereto.
Figure 4:
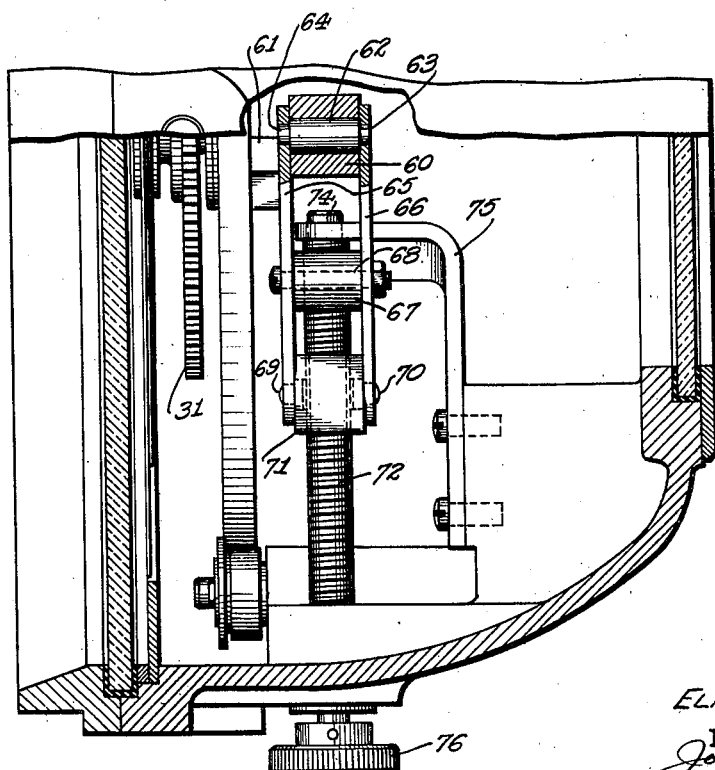
Fig. 4 is a section taken substantially on the line 4—4 of Fig. 2.

Referring to Fig. 1 of the drawings, there is shown a repeater system of the type to which this invention is applied. While the system is shown in connection with a master magnetic compass and a repeater compass, certain features of this invention have more general applicability to repeater systems generally, as will be more fully pointed out hereinafter. In the system shown, a master magnetic compass is employed, said compass comprising a compass card 10 having magnetic elements 11 attached thereto, said card being pivotally supported upon a pivot post 12 fixed within a movable bowl 13 supported within an outer casing 14. The inner bowl 13 is mounted for rotation in a supporting plate 20 in the outer casing 14 by means of a journal 15 supported in bearings 16 and 17. Relative movements between the bowl 13 and the card 10 caused by movement of the vessel upon which the compass is mounted will cause displacement between two conductive members 21 and 22, which displacement may be caused to control any suitable electric circuit in a well known manner to actuate an azimuth motor 25 which is geared to casing 13 by gearing 26, 27 to cause the inner bowl or casing 13 to follow the movements of card 10. The inner bowl 13 is thus moved in a direction opposite to the direction of movement of the ship, and when the elements 21 and 22 resume their original position, the azimuth motor stops. Thus rotation of the inner bowl by the azimuth motor 25 may be caused to operate the transmission system for actuating repeater systems. The power is derived from the azimuth motor, which in driving gearing 26, 27 and inner bowl 13 may be caused also to drive a self-synchronous transmitter motor 30 through gearing 28 meshing with gearing 27. The self-synchronous motor 30 is electrically connected to a similar self-synchronous repeater motor 30' which through gearing 29, 31 may be caused to operate a repeater compass card 32.

Figure 3:
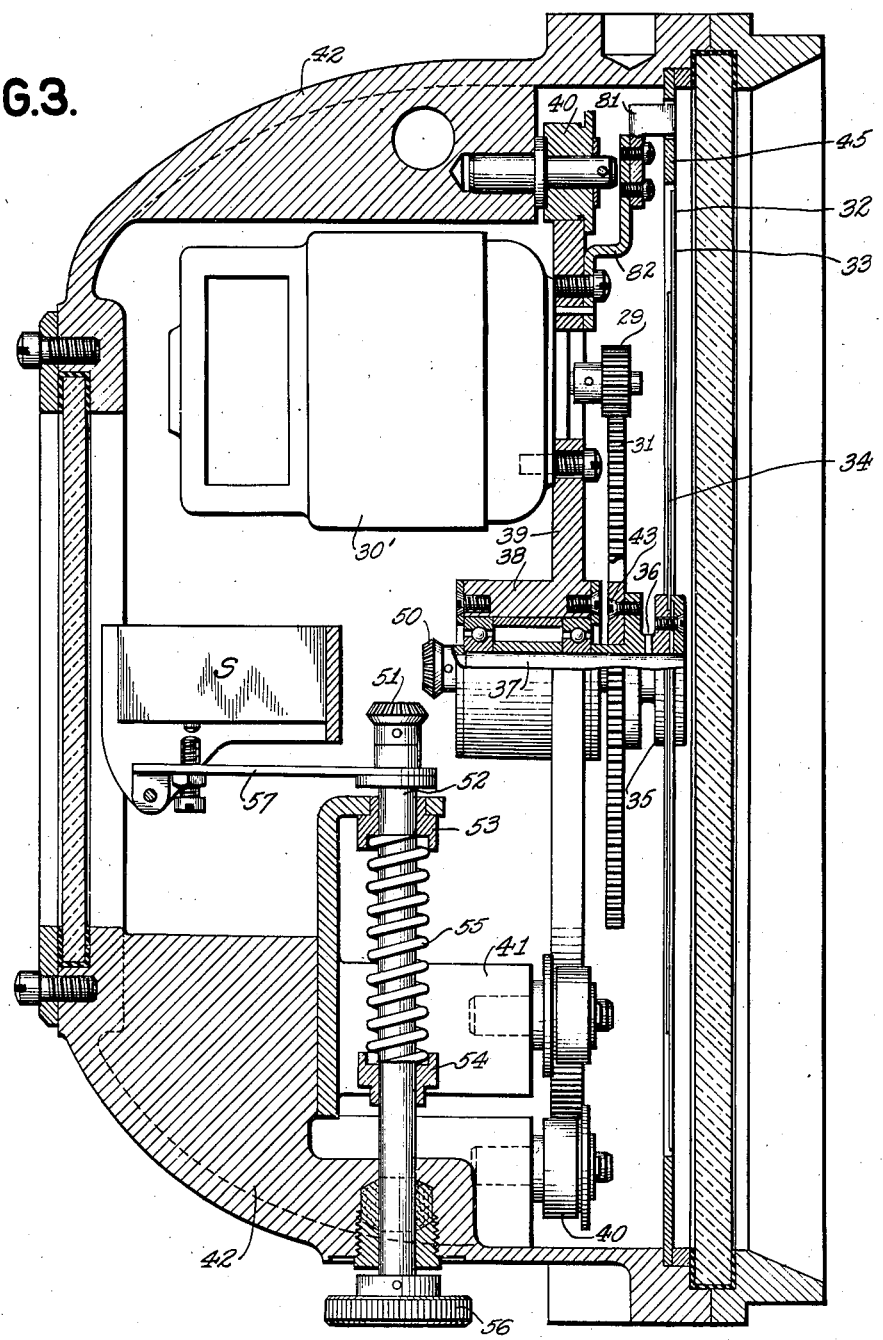
Fig. 3 is a section taken substantially on the line 3—3 of Fig. 2.

The repeater compass may consist of the card 32 (see Fig. 3) having a translucent portion 33 and a metallic backing 34 of lesser diameter to provide a luminous peripheral portion for the card. The said card is mounted in a hub 35 pinned at 36 to a shaft 37 which is journaled in a hub 38 formed in a plate 39 supported on its periphery by a plurality of rollers 40 journaled in blocks 41 fixed to the casing 42. The said plate 39 supports the self-synchronous receiver motor 30' which drives the card 32 through the gears 29, 31, said gear 31 being fastened to the hub 35 at 43. The supporting plate 39 is normally held against rotation by means to be described hereinafter. The card 32 operates in cooperation with the lubber line L carried by a peripheral member 45 concentric with the outer periphery of the card 32.

By reference to Fig. 1 it will be seen that the transmitter motor 30 is geared to bowl 13 by multiplying gearing. As shown, this gearing is 8 to 1 and the purpose of such multiplying gearing is to reduce the transmission error by reason of moving the transmitter motor through 8 complete revolutions for every one revolution of the gear 27 and hence for every revolution of card 10 relative to the ship. In this manner a finer and more accurate transmission is accomplished. At the receiver end the reverse gearing is employed to give a reduction of 8 to 1 so that card 32 will move in synchronism with card 10 relative to the ship. A consequence of this construction is that under certain conditions, as stated in the introduction hereto, the receiver motor 30' may lose synchronism with motor 30 for one or more complete revolutions since these motors are synchronous only within the limits of one revolution. Thus, if the gearing between the card 10 and motor 30 is 8 to 1, it means that each revolution of motor 30 corresponds to 45°. Within the limits of 22½° in either direction motor 30 may be displaced from motor 30' when the circuit between them is broken, and upon reestablishment of the circuit, motor 30' will assume a position synchronous with motor 30. Let us assume, however, that while the circuit between motors 30 and 30' is broken, that is, while the repeater system is not operating, the ship turns through 100° and therefore motor 30 has been turned through two complete revolutions plus 10° additional. Upon reestablishment of the transmission circuit, motor 30' will assume the same position as motor 30 for the 10° of movement, but the two complete revolutions of motor 30 will, of course, have no effect upon motor 30'. Thereafter card 32 would continue to move through the same relative angular positions as card 10 with respect to the ship but would be two full revolutions of motor 30, in other words 90°, displaced from card 10.

Under the above circumstances it is desirable that repeater card 32 be brought into full agreement with card 10, and therefore the following means are provided for permitting the card 32 to be fully synchronized with card 10. For this purpose, the shaft 37 upon which card 32 is mounted is provided with bevel gear 50 with which is adapted to mesh a bevel gear 51 normally held out of engagement with bevel gear 50 by reason of the fact that bevel gear 51 is carried by a shaft 52 extending through a bracket 53 and carrying a bracket 54 fixed to the shaft. Between the bracket 53 fixed to the casing 42 and the bracket 54 carried by the shaft 52 there is positioned a compression spring 55 which normally pushes against bracket 53 and tends to push the shaft 52 outwardly to disengage gear 51 from gear 50. The shaft 52 extends through the casing 42 and carries at its outer end a knob 56 so that when it is desired to cause gear 51 to engage gear 50, the operator presses inwardly upon shaft 52 by means of knob 56 and, after engagement of gears 50 and 51 is accomplished, he turns knob 56 to rotate the card 32 until the said card has been brought into synchronism with card 10, or at least until said card 32 has been brought within the range corresponding to one revolution of the motors 30 and 30'. The card 32 is thus rotated in azimuth relative to the master compass card 10 and relative to the transmission system so that a different relationship (equivalent to one or more revolutions of the motors) is established. In this case, where one revolution of motors 30 and 30' corresponds to 45°, the card 32, if brought anywheres within 22½° to either side of the position of card 10, will be in position to be brought into full synchronism when the transmission circuit is established. If the gearing is such that motor 30 makes any different number of revolutions for one revolution of card 10, as, for instance, if the ratio were 4 to 1, then it would be sufficient to bring card 32 anywheres within 45° to either side of the position of card 10 and reestablishment of the transmission circuit would accomplish full synchronism.

Since the rotation of shaft 37 with its card 32 would also rotate gears 31 and 29, the receiver motor 30' would act as a transmitter and transmit an impulse to other repeater motors which may be actuated by transmitter motor 30, and change the position of said repeater motors to cause the latter to lose synchronism with motor 30. In order to prevent this condition from arising, the shaft 52 carries a member 57 which is actuated when the shaft 52 is pushed inwardly to cause engagement of gears 50 and 51, and such movement of member 57 is caused to actuate a switch such as a micro-switch S in the transmission circuit between motor 30 and the repeater motors 30' to interrupt the said circuit.

The magnets 11, and therefore the compass card 10, do not indicate the true geographic meridian but are subject to the well known magnetic variation which differs at various points on the earth's surface. The repeater card 32 would therefore also not indicate the true geographic meridian but would be offset from this meridian by the amount of the magnetic variation. In order that the repeater compass may indicate the true geographic meridian, there is provided means for displacing the card 32 in azimuth, without changing its relationship to the transmission mechanism, by an amount equal to the magnetic variation and in the proper direction to bring the indication of card 32 into the true geographic meridian. It is for this purpose that the plate 39 is mounted in the rollers 40 as previously described, for by rotating said plate in its mounting in the rollers 40 in one direction or the other through the proper angle, the card 32 carried by said plate 39, as well as the repeater motor 30', will be turned as a unit into the true geographic meridian. Since card 32 and the repeater motor 30' turn as a unit, the relationship between the card and the transmission system remains unchanged. For so operating the plate 39 there is provided a mechanism shown in Figs. 2 and 3. This mechanism comprises a bracket 60 fixed to the rear of plate 39 at 61. The bracket is U-shaped, the legs 61 extending at right angles to the plate 39 and the member 60 being the cross piece parallel to said plate. A bearing 62 is journaled in said bracket 60 and has pivoted at the outer ends of said bearing on pivots 63, 64 a pair of side members 65, 66 joined together by a rotary spacer 67 fastened to the members 65, 66 at 68. The members 65, 66 are journaled at their lower ends at 69 and 70 in a traveling nut 71 adapted to move linearly in response to the threading action of screw 72 extending therethrough. The said screw is journaled at its inner end 74 in a bracket 75 fixed to the casing 42, and at its other end extends through the casing and carries a knob 76. By rotating the knob 76, the nut 71 is caused to travel toward or away from the bracket 60 which is fixed to the plate 39 in a position offset from the pivotal center 80 of movement of the plate 39. The links 65, 66 thus form a crank arm which pushes upon the bracket 60 to rotate the plate 39 around the center 80.

The amount of rotation corresponds to the magnetic variation, and the direction of rotation is opposite to the direction of the magnetic variation. The amount by which the plate 39, and hence the card 32, has been displaced for magnetic variation may be indicated by means of an index 81 fixed to the plate 39 by means such as bracket 82 and extending through a slot 84 in a peripheral lubber line plate 45 so that at all times the amount of magnetic variation which has been compensated for will be readily readable on a scale 85 in said peripheral plate 45.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

In a repeater system for magnetic compasses comprising a master magnetic compass having a sensitive element, a repeater compass having a rotatable responsive element, means whereby said repeater element is actuated in synchronism with said sensitive element, said means including a self-synchronous transmission system comprising motors connected respectively to said sensitive element and said repeater element, and means whereby said motors rotate a plurality of revolutions for each revolution of said sensitive element, the improvement which consists in means whereby the repeater element may be corrected for magnetic deviation, said last-named means comprising means whereby said repeater element and its respective motor may be rotated in azimuth relative to said sensitive element without changing the relationship of said sensitive element to said transmission system, a pointer adapted to be actuated by said preceding means, a fixed scale cooperating with said pointer for indicating the amount of said relative movement to indicate the amount of the deviation correction, and means whereby said repeater element may be actuated to bring the same within synchronizing range of the sensitive element, said last-named means comprising means whereby said repeater element may be rotated relative to said sensitive element and said transmission system and relative to said pointer and said scale whereby the relationship of said pointer and said scale remains unaffected by said last-named rotation of said repeater element.

ELMER A. SPERRY, Jr.